United States Patent
Chen et al.

(10) Patent No.: US 12,381,025 B2
(45) Date of Patent: Aug. 5, 2025

(54) LOW LOSS MAGNETODIELECTRIC MATERIAL

(71) Applicant: ROGERS CORPORATION, Chandler, AZ (US)

(72) Inventors: Yajie Chen, Brighton, MA (US); Lance Young, Shrewsbury, MA (US); Qifan Li, Hubei (CN); Megan Hott, Boston, MA (US)

(73) Assignee: ROGERS CORPORATION, Chandler, AZ (US)

( * ) Notice: Subject to any disclaimer, the term of this patent is extended or adjusted under 35 U.S.C. 154(b) by 704 days.

(21) Appl. No.: 17/741,746

(22) Filed: May 11, 2022

(65) Prior Publication Data

US 2022/0367093 A1   Nov. 17, 2022

Related U.S. Application Data (60) Provisional application No. 63/189,431, filed on May 17, 2021.

(51) Int. Cl.

| | |
|---|---|
| *H01F 1/34* | (2006.01) |
| *C04B 35/26* | (2006.01) |
| *C04B 35/626* | (2006.01) |
| *C04B 35/64* | (2006.01) |
| *C08K 3/22* | (2006.01) |
| *H01F 1/36* | (2006.01) |
| *H01F 1/37* | (2006.01) |

(52) U.S. Cl.
CPC ......... *H01F 1/344* (2013.01); *C04B 35/2633* (2013.01); *C04B 35/6261* (2013.01); *C04B 35/64* (2013.01); *C08K 3/22* (2013.01); *C04B 2235/3256* (2013.01); *C04B 2235/3274* (2013.01); *C04B 2235/5436* (2013.01); *C04B 2235/6567* (2013.01); *C04B 2235/6583* (2013.01); *C08K 2003/2289* (2013.01); *C08K 2201/01* (2013.01)

(58) Field of Classification Search
CPC . H01F 1/34; H01F 1/342; H01F 1/344; H01F 1/348; H01F 1/36; H01F 1/37; C01G 51/42; C01G 51/66; C04B 35/26; C04B 35/2616; C04B 35/2641; C04B 35/2633; C04B 35/6261; C04B 35/64; C04B 2235/3274; C04B 2235/6567
See application file for complete search history.

(56) References Cited

U.S. PATENT DOCUMENTS

| | | |
|---|---|---|
| 3,020,426 A | 2/1962 | Van Der Burgt |
| 3,461,072 A | 8/1969 | Winkler |
| 4,664,831 A | 5/1987 | Hibst et al. |
| 4,911,957 A | 3/1990 | Oishi et al. |
| 4,957,812 A | 9/1990 | Aoki et al. |
| 5,593,612 A | 1/1997 | Lubitz |
| 6,071,430 A | 6/2000 | Lebourgeois et al. |
| 6,358,432 B1 | 3/2002 | Tomono et al. |
| 6,436,307 B1 | 8/2002 | Lebourgeois et al. |
| 6,736,990 B2 | 5/2004 | Aoki et al. |
| 8,263,224 B2 | 9/2012 | Tokiwa |
| 9,596,755 B2 | 3/2017 | Sethumadhavan et al. |
| 10,468,169 B2 | 11/2019 | Chen et al. |
| 10,766,786 B2 | 9/2020 | Chen et al. |
| 2002/0050309 A1 | 5/2002 | Marusawa |
| 2003/0052298 A1 | 3/2003 | Wang et al. |
| 2003/0091841 A1 | 5/2003 | Marusawa |
| 2004/0069969 A1 | 4/2004 | Endo et al. |
| 2007/0231614 A1 | 10/2007 | Kondo et al. |
| 2009/0057606 A1 | 3/2009 | Tada et al. |
| 2009/0297432 A1 | 12/2009 | Hill |
| 2010/0000769 A1 | 1/2010 | Ohmi et al. |
| 2012/0229354 A1 | 9/2012 | Ishikura et al. |

(Continued)

FOREIGN PATENT DOCUMENTS

| | | |
|---|---|---|
| CN | 102076629 A | 5/2011 |
| CN | 103304186 A | 9/2013 |

(Continued)

OTHER PUBLICATIONS

International Search Report for International Applicaiton No. PCT/US2022/029361; International Filing date: May 16, 2022; Date of Mailing: Jul. 9, 2022; 5 pages.

(Continued)

*Primary Examiner* — Matthew E. Hoban
*Assistant Examiner* — Lynne Edmondson
(74) *Attorney, Agent, or Firm* — CANTOR COLBURN LLP (57) ABSTRACT

In an aspect, a $Co_2Z$-type ferrite comprises oxides of at least Me, Co, Mo, Li, and Fe; wherein Me is at least one of Ba or Sr. In another aspect, the $Co_2Z$-type ferrite comprises a Z-type hexaferrite an amount of lithium molybdate. In another aspect, the $Co_2Z$-type ferrite has a formula $Li_2MoO_4 \cdot Ba_xSr_{3-x}Co_{2+y-z}Me'_yMe''_zFe_{24-2y-m}O_{41}$, wherein Me' is at least one of Ti, Mo, Ru, Ir, Zr, or Sn; Me" is at least one of Zn, Mn, or Mg; x is 0 to 3; y is 0 to 1.8; z is 0 to 1.8; and m is −4 to 4. In yet another aspect, a method of making a $Co_2Z$-type ferrite comprises milling an initial $Co_2Z$-type ferrite and $Li_2MoO_4$ to form a mixed ferrite; and calcining the mixed ferrite to form the $Co_2Z$-type ferrite.

20 Claims, 10 Drawing Sheets

(56) References Cited

U.S. PATENT DOCUMENTS

| | | | |
|---|---|---|---|
| 2013/0115160 A1* | 5/2013 | Hill | H01P 1/397 |
| | | | 423/594.2 |
| 2013/0292602 A1 | 11/2013 | Hill | |
| 2014/0291571 A1 | 10/2014 | Hirose | |
| 2014/0346387 A1 | 11/2014 | Hill et al. | |
| 2016/0086728 A1 | 3/2016 | Suetsuna et al. | |
| 2016/0113113 A1 | 4/2016 | Sethumadhavan et al. | |
| 2016/0118171 A1 | 4/2016 | Hill | |
| 2016/0276072 A1 | 9/2016 | Sethumadhavan et al. | |
| 2017/0213628 A1 | 7/2017 | Chen et al. | |
| 2017/0222331 A1 | 8/2017 | Pance et al. | |
| 2018/0016157 A1* | 1/2018 | Chen | C04B 35/6262 |
| 2019/0013128 A1 | 1/2019 | Chen et al. | |
| 2019/0221343 A1 | 7/2019 | Chen et al. | |
| 2019/0264005 A1 | 8/2019 | Horn et al. | |
| 2019/0318858 A1 | 10/2019 | Chen et al. | |
| 2021/0020343 A1 | 1/2021 | Chen et al. | |
| 2021/0032121 A1 | 2/2021 | Li et al. | |
| 2021/0043346 A1 | 2/2021 | Li et al. | |
| 2021/0065943 A1 | 3/2021 | Zhang et al. | |
| 2021/0179442 A1 | 6/2021 | Chen et al. | |
| 2021/0225566 A1 | 7/2021 | Zhang et al. | |
| 2021/0246046 A1 | 8/2021 | Chen et al. | |
| 2021/0261433 A1 | 8/2021 | Chen et al. | |
| 2022/0367094 A1 | 11/2022 | Chen et al. | |
| 2023/0352221 A1 | 11/2023 | Chen et al. | |
| 2023/0352222 A1 | 11/2023 | Chen et al. | |
| 2023/0352223 A1 | 11/2023 | Chen et al. | |
| 2023/0399237 A1 | 12/2023 | Chen et al. | |

FOREIGN PATENT DOCUMENTS

| | | |
|---|---|---|
| CN | 101636449 B | 10/2014 |
| CN | 104193224 A | 12/2014 |
| DE | 3907220 | 9/1990 |
| EP | 1652829 A2 | 5/2006 |
| EP | 2028663 A1 | 2/2009 |
| EP | 2784044 A1 | 10/2014 |
| EP | 3012843 A1 | 4/2016 |
| GB | 1105788 A | 3/1968 |
| GB | 2599251 A | 3/2022 |
| JP | 62216922 A | 9/1987 |
| JP | S36365085 A | 3/1988 |
| JP | 6489504 A | 4/1989 |
| JP | H01200605 A | 8/1989 |
| JP | H02120237 A | 5/1990 |
| JP | H09167703 | 6/1997 |
| JP | H09232123 A | 9/1997 |
| JP | 2000235916 A | 8/2000 |
| JP | 2001085210 A | 3/2001 |
| JP | 2009105365 A | 5/2009 |
| WO | 2012103020 A2 | 8/2012 |
| WO | 2016064459 | 4/2016 |
| WO | 2016123598 A1 | 8/2016 |
| WO | 2017068444 | 4/2017 |
| WO | 2017127388 A1 | 7/2017 |
| WO | 2020162295 A1 | 8/2020 |
| WO | 2021061599 A1 | 4/2021 |
| WO | 2021162886 A1 | 8/2021 |

OTHER PUBLICATIONS

Written Opinion for International Applicaiton No. PCT/US2022/029361; International Filing date: May 16, 2022; Date of Mailing: Jul. 9, 2022; 9 pages.

Aoyama et al.; "Preparation and Characterization of Z-type Hexaferrites, Ba3(1-x)Sr3xCo2Fe24O41 with x=0-0.5, via a two-step calcination with an intermediate wet milling"; J. Electroceram; 17; pp. 61-64 (2006).

Bid et al.; "Microstructure Characterization of Mechanosynthesized Nanocrystalling NiFe2O4 by Rietveld's Analysis"; Physica E 39; pp. 175-184; (2007).

Bierlich et al., "Low-temperature sintering and magnetic properties of Sc- and In-substituted M-type hexagonal barium ferrites for microwave applications", Abstract, Feb. 2017 Materials Research Bulletin 86:19-23 ; 11 pages.

Brando et al., "Microwave Electromagnetic Characteristics of New Substituted M-Hexaferrites BaFe12-2xAxMexO19 (A=Ru, Ir; Me=Co, Zn)", Journal De Physique IV France, Mar. 1997.

Brockman et al. "Nickel-Zinc Ferrite: I, Effect of Composition on the Magnetic Proprties of a Nickel-Zinc-(Cobalt) Ferrite", Journal of the American Ceramic Society, vol. 53, No. 9, Sep. 1, 1970; pp. 517-520.

Cao et al. "Hydrogen-Induced Lateral Growth of Nickel Coating on Ba3Co2Fe24O41•Co2Z-Based Hexaferrite during the Electroplating of Multilayer Chip Inductors," Journal of the Electrochemical Society, 2002, vol. 149 Issue 12, pp. J89-J92.

Haijun et al., "The preparation and microwave properties of Ba3ZnzCo2—zFe24O41 ferrite by citrate sol-gel process", Materials Science and Engineering, B84, 2001, pp. 252-257.

Ismail et al.; "Magnetic Properties of Mechanically Alloyed Cobalt-Zinc Ferrite Nanoparticles"; J. Supercond Nov Magn; 27; pp. 1293-1298; (2014).

Kim et al., "Effects of in3+ site occupancy on the magnetic properties of M-type strontium hexaferrites", AIB Advances 10, 015040 (2020); https://doi.org/10.1063/1.5130073; 5 pages.

Kim, H., et al. "Epitaxial growth of Zn2Y ferrite films by pulsed laser deposition," Journal of Vacuum Science, American Institute of Physics, 2 Huntington Quadrangle, Melville, NY 11747; vol. 17; No. 5; Sep. 1999; pp. 3111-3114.

Kohn, J.A. and Eckart, D.W. "Cell, Symmetry and Basic Structure of a New Ferrimagnet," Mat. Res. Bull., vol. 6, pp. 743-748, 1971.

Kong et al., "Ni—Zn Ferrites Composites With Almost Equal Values of Permeability and Permittivity for Low-Frequency Antenna Design," IEEE Transactions on Magnetics, Jan. 2007, pp. 6-9, vol. 43, No. 1.

Kristiantoro et al. , "Magnetic properties of cobalt ferrite synthesized by mechanical alloying", from AIP Conf 1964, 020003 (2018) Published Online May 15, 2018; 5 pages.

Lee et al. "Figure of merit of X-type hexaferrite (Ba2Co2Fe28O46) for mobile antenna applications", Microwave and Optical Technology Letters, vol. 60, Issue 3, Feb. 5, 2018, https://doi.org/10.1002/mop.31053.

Lee et al., "Low Loss Co2Z (Ba3Co2Fe24O41)-Glass Composite for Gigahertz Antenna Application," Journal of Applies Physics, 2011, vol. 109, 07E530-2.

Li et al. "High-frequency magnetic properties of W-type barium-ferrite BaZn2—xCoxFe16O27 composites", Journal of Applied Physics 94, 5918 (2003): https://doi.org/10.1063/1.1618945.

Li et al., "High-Frequency Properties and Attenuation Characteristics of WBa Hexaferrite Composites with Doping of Varius Oxides," Transactions of Magnetics, Feb. 2009, pp. 670-677, vol. 45 No. 2.

Li et al; "Static and Dynamic Magnetic Properties of Co2Z Barium Ferrite Nanoparticle Composites"; Journal of Materials Science, 40, pp. 719-723 (2005).

Li, Jie, et al. "Structural and magnetic properties of M-Ti (M=Ni or Zn) co-substituted M-type barium ferrite by a novel sintering process," Journal of Materials Science: Materials in Electronics. Chapman and Hall, London, GB; vol. 26; No. 2; Nov. 15, 2014, pp. 1060-1065.

Li, Qifan, et al. "Emerging magnetodielectric materials for 5G communications: 18H hexaferrites," Acta Materialia 231 (2022) 117854 Elsevier Ltd., 10 pages.

Lui, Chaocheng, et al. "Characterizations of magnetic transition behavior and electromagnetic properties of Co—Ti co-substituted SrM-based hexaferrites SrCoxTixFe12—2xO19 compounds," Journal of Alloys and Compounds, vol. 784, Jan. 11, 2019, pp. 1175-1186.

Mahmood, Sami H., et al. "Modification of the Magnetic Properties of Co$_2$Y Hexaferrites by Divalent and Trivalent Metal Substitutions," Solid State Phenomena, vol. 241; Oct. 2015, pp. 93-125.

Mattei et al., "Magnetic and dielectric properties in the UHF frequency band of half-dense Ni—Zn—Co ferrites ceramics with Fe-excess and Fe-deficiency", Journal of Magnetism and Magnetic Materials, Sep. 2017, 8 pages.

(56) References Cited

OTHER PUBLICATIONS

Morch et al. "Structure and Magnetic properties of W-type hexaferrites," 2019, IUCRJ, pp. 492-499, vol. 6.
Mu et al., "Improvement of high-frequency characteristics of Z-type hexaferrite by dysprosium doping", Journal of Applied Physics, 109, 123925, 2011, 6 pages.
Narayanasamy et al., "Influence of Mechanical Milling and Thermal Annealing on Electrical and Magnetic Properties of Nanstructured Ni—Zn and Coblat Ferrites," Jun. 2208, Bull Mater Sci., vol. 31 No. 3, pp. 373-380.
Obol et al.; "Oriented Y-type Hexaferrites for Ferrite Device"; J. Appl. Phys.; 91(10); pp. 7616-7618; (2002).
Pullar et al; "Hexagonal Ferrites: A Review of the Synthesis, Properties and Applications of Hexaferrite Ceramica"; Progress in Materials Science; 57; pp. 1191-1134; (2012).
Pullar, "Hexagonal Ferrite Fibres and Nanofibres," Trans Tech Publications, 2016, pp. 1-68, vol. 241.
Pullar, "Magnetic Properties of Aligned Co2Z Hexagonal Z-Ferrite Fibers," International Journal of Applied Ceramic Technology, 2014, pp. 451-456, vol. 11, No. 3.
Sahoo et al. Enhanced Magnetoelectricity in Bismuth Substituted SrFe12O19 Hexaferrite, Aug. 2019, Journal of Applied Physics, vol. 126, No. 7.
Savage, R. O. et al., "Magnetic Properties of Single Crystal CuNi—18H and MgZn—18H Solid Solutions", AIP Conference Proceedings (1975). vol. 24, pp. 491-492, doi.org/10.1063/1.29974.
Singh et al. "Static Magnetic Properties of Co and Ru substituted Ba—Sr ferrite," 2008, Materials Research Bulletin, pp. 176-184, vol. 43.
Su et el., "Low Loss Factor Co2Z Ferrite Composites with Equivalent Permittivity and Permeability for Ultra-high Frequency Applications," Applied Physics Letters, Aug. 2014, vol. 105 No. 062402.
Tauber, A. et al., "Magnetic Properties of a Unique 18-Layer Hexagonal Ferrite", Journal of Applied Physics 42, 1738 (1971); https://doi.org/10.1063/1.1660419; Published Online: Dec. 19, 2003; 4 pages; https://doi.org/10.1063/1.1660419.
Tauber, A. et al., "Magnetic Properties of Single Crystal Ba5Me2Ti3Fe12O31, ME=Co, Cu", AIP Conference Proceedings (1972) 5(1):1547-1551 ; https://doi.org/10.1063/1.2953911.
Waje et al.; "Sintering Temperature dependence of Room Temperature Magnetic and Dielectric Properties of Co0.5Zn0.5F32O4 Prepared using Mechanically Alloyed Nanoparticles"; Journal of magnetism and Magnetic Materials; 322; pp. 686-691; (2010).
Watanabe Kazuya et al., "Discovery of the New Crystallographic Phase of an Exotic Magnetic Oxide: 118H-type Hexaferrite," Journal of the physical society of Japan, Jan. 15, 2020, vol. 89, No. 1, p. 014704.
Faouri et al., "High quality factor cold sintered Li2MoO4—BaFe12O19 composites for microwave applications," Mar. 2019, Acta Materialia, vol. 166, pp. 202-207.

* cited by examiner

LOW LOSS MAGNETODIELECTRIC MATERIAL

CROSS-REFERENCE TO RELATED APPLICATION

This application claims the benefit of U.S. Provisional Patent Application Ser. No. 63/189,431 filed May 17, 2021. The related application is incorporated herein in its entirety by reference.

TECHNICAL FIELD

The disclosure is directed to a Z-type hexaferrite comprising lithium.

BACKGROUND

Improved performance and miniaturization are needed to meet the ever-increasing demands of devices used in very high frequency applications, which are of particular interest in a variety of commercial and defense related industries. As an important component in radar and modern wireless communication systems, antenna elements with compact sizes are constantly being developed. It has been challenging however to develop ferrite materials for use in such high frequency applications as most ferrite materials exhibit relatively high magnetic loss at high frequencies.

In general, hexagonal ferrites, or hexaferrites, are a type of iron-oxide ceramic compound that has a hexagonal crystal structure and exhibits magnetic properties. Several types of families of hexaferrites are known, including Z-type ferrites, $Ba_3Me_2Fe_{24}O_{41}$, and Y-type ferrites, $Ba_2Me_2Fe_{12}O_{22}$, where Me can be a small 2+ cation such as Co, Ni, or Zn, and Sr can be substituted for Ba. Other hexaferrite types include M-type ferrites ($(Ba,Sr)Fe_{12}O_{19}$), W-type ferrites ($(Ba,Sr)Me_2Fe_{16}O_{27}$), X-type ferrites ($(Ba,Sr)_2Me_2Fe_{28}O_{46}$), and U-type ferrites ($(Ba,Sr)_4Me_2Fe_{36}O_{60}$).

Hexaferrites with a high magnetocrystalline anisotropy field are good candidates for gigahertz antenna substrates because they have a high magnetocrystalline anisotropy field and thereby a high ferromagnetic resonance frequency. While $Co_2Z$ hexaferrite ($Ba_3Co_2Fe_{24}O_{41}$) materials have been developed for some antenna applications, improved Z-type ferrites for use in low frequency applications are desired.

BRIEF SUMMARY

Disclosed herein is a $Co_2Z$-type hexaferrite.

In an aspect, a $Co_2Z$-type ferrite comprises oxides of at least Me, Co, Mo, Li, and Fe; wherein Me is at least one of Ba or Sr.

In another aspect, a composite comprises the $Co_2Z$-type ferrite.

In yet another aspect, a method of making a $Co_2Z$-type ferrite comprises milling an initial $Co_2Z$-type ferrite and $LiMoO_4$ to form a mixed ferrite; and calcining the mixed ferrite to form the $Co_2Z$-type ferrite.

The above described and other features are exemplified by the following figures, detailed description, and claims.

BRIEF DESCRIPTION OF THE DRAWINGS

The following Figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

It was discovered that by incorporating a low dielectric loss material such as lithium molybdate into to a $Co_2Z$-phase hexaferrite, a composition with easily tunable dielectric properties can be obtained while maintaining the magnetic properties. Without wanting to be bound by theory, it is believed from a number of experiments that the addition of the lithium molybdate (also referred to herein as the dielectric phase) can modify the dielectric field in a primary phase of the $Co_2Z$-type ferrite.

While the exact crystallographic structure of the $Co_2Z$-type ferrite is not fully understood, it is believed that the $Co_2Z$-type ferrite may include a magnetic phase of the $Co_2Z$-type ferrite and a separate dielectric phase comprising the lithium molybdate. Conversely, it could be that a single crystallographic structure of the $Co_2Z$-type ferrite exists, indicating complete mixing of the respective phases. In other words, it may not be possible to necessarily separate the magnetic structure or the crystal structure of the respective phases. Therefore, the final structure can be either a solid solution of the components, a distinguishable multi-phase structure, with two or more phases entangled in each other in any fashion or not entangled in each other, or a combination of thereof. Therefore, it is noted that the terminology of the $Co_2Z$-type ferrite used herein includes a ferrite with a distinguishable multiphase morphology, a solid solution of the ferrite, or a combination thereof. Since the exact structure of the $Co_2Z$-type ferrite is not known, the formulae presented herein for the $Co_2Z$-type ferrite are generally written in accordance with the mixed ferrite formed during the preparation of the $Co_2Z$-type ferrite where the lithium molybdate, $Li_2MoO_4$, is separated out for simplicity. It will be understood though that these formulae do not limit the crystallographic structure of the $Co_2Z$-type ferrite and the resultant $Co_2Z$-type ferrite can include two separate phases, a single phase, or something in between.

The $Co_2Z$-type ferrite comprises oxides of at least Me, Co, Mo, Li, and Fe; wherein Me is at least one of Ba or Sr. The $Co_2Z$-type ferrite can have the formula (1).

$$Li_2MoO_4 \cdot Ba_xSr_{3-x}Co_{2+y-z}Me'_yMe''_zFe_{24-2y-m}O_{41} \quad (1)$$

Me' can be at least one of Ti, Mo, Ru, Ir, Zr, or Sn. Me" can be at least one of Zn, Mn, or Mg. The variable x can be 0 to 3, 0.1 to 3, or 0.8 to 2, or 1 to 2, or 3. The variable y can be 0 to 1.8, 0, or 0 to 1.5, or 0.1 to 1.5, or 0.5 to 1. The variable z can be 0 to 1.8, 0, or 0 to 1.5, or 0.1 to 1.5, or 0.5 to 1. The variable m can be −4 to 4, −3 to 3, or 0 to 4, or −3 to 4, or 2 to 3.

The $Co_2Z$-type ferrite can have the formula (2).

$$Li_2MoO_4 \cdot Ba_xSr_{3-x}Co_2Fe_{24-m}O_{41} \quad (2)$$

The variable x can be 0 to 3, or 0.1 to 3, or 0.8 to 2, or 1 to 2, or 3. The variable m can be −4 to 4, or 0 to 4, or 2 to 3.

The $Co_2Z$-type ferrite can have the formula (3)

$$(n)Li_2MoO_4 \cdot (1-n)Ba_xSr_{3-x}Co_{2+y-z}Me'_yMe''_zFe_{24-2y-m}O_{41} \quad (3)$$

wherein n indicates the relative amount of the $Li_2MoO_4$ in the $Co_2Z$-type ferrite. The variable n can be greater than 0 to 0.05 and the remaining variables are defined above.

The $Li_2MoO_4$ can be present in the $Co_2Z$-type ferrite in an amount of 0.005 to 1 weight percent (wt %), or 0.01 to 1 wt %, or 0.01 to 0.5 wt % based on the total weight of the $Co_2Z$-type ferrite. The $Li_2MoO_4$ can be present in the $Co_2Z$-type ferrite as a distinct phase or can be dispersed in the $Co_2Z$-type ferrite.

The $Co_2Z$-type ferrite can comprise a magnetic phase of the Z-type ferrite. The magnetic phase can have the formula $Ba_xSr_{3-x}Co_{2+y-z}Me_yMe'_zFe_{24-2y-m}O_{41}$, where the variables are defined above.

The $Co_2Z$-type ferrite can be in the form of particulates (for example, having a spherical or irregular shape) or in the form of platelets, whiskers, flakes, etc. A $D_{50}$ particle size by volume of the particulate $Co_2Z$-type ferrite can be 0.5 to 50 micrometers, or 1 to 10 micrometers. Platelets of the $Co_2Z$-type ferrite can have an average maximum length of 0.1 to 100 micrometers and an average thickness of 0.05 to 1 micrometer. The $Co_2Z$-type ferrite can have a porosity of 0 to 50 volume percent (vol %), or 20 to 45 volume percent based on the total volume of the $Co_2Z$-type ferrite. The $Co_2Z$-type ferrite can have an average particle size is of 1 to 20 micrometers, or 5 to 15 micrometers as measured using scanning electron microscopy.

The $Co_2Z$-type ferrite can have at least one of permeability ($\mu'$) values in the gigahertz range and a low magnetic loss tangent (tan $\delta_\mu$, $\mu''/\mu'$). The permeability of the $Co_2Z$-type ferrite can be 2 to 10 at a frequency of 0.5 to 3 gigahertz, or 0.5 to 1.2 gigahertz. The permeability of the $Co_2Z$-type ferrite can be greater than or equal to 2, or greater than or equal to 3, or 2 to 10, or 2 to 3 at a frequency of 0.5 to 2 gigahertz, or 0.5 to 1.2 gigahertz. The magnetic loss tangent of the $Co_2Z$-type ferrite can be less than or equal to 0.3, or less than or equal to 0.1, or 0.001 to 0.2 at a frequency of 0.5 to 2 gigahertz, or 0.5 to 1.2 gigahertz. The magnetic loss tangent of the $Co_2Z$-type ferrite can be 0.02 to 0.1, or 0.05 to 0.1 at a frequency of 1 to 6 gigahertz, or 0.5 to 1.2 gigahertz.

The $Co_2Z$-type ferrite can have at least one of good permittivity ($\varepsilon'$) values in the gigahertz range and a low magnetic loss tangent (tan $\delta_\varepsilon$, $\varepsilon''/\varepsilon'$). The permittivity of the $Co_2Z$-type ferrite can be less than or equal to 8, or less than or equal to 6, or 2 to 8, or 6 to 10 at a frequency of 1 to 10 gigahertz, or 0.5 to 1.2 gigahertz. The permittivity of the $Co_2Z$-type ferrite can be less than or equal to 8, or less than or equal to 7, or 5 to 7 at a frequency of 1 to 10 gigahertz, or 0.5 to 0.2 gigahertz. The $Co_2Z$-type ferrite can have a dielectric loss tangent tan $\delta_\varepsilon$ of less than or equal to 0.01, or less than or equal to 0.007, or 0.001 to 0.007 at a frequency of 1 to 10 gigahertz, or 0.5 to 2 gigahertz. The $Co_2Z$-type ferrite can have a dielectric loss tangent tan $\delta_\varepsilon$ of less than or equal to 0.005 at a frequency of 1 to 10 gigahertz, or 0.5 to 1.2 gigahertz.

The $Co_2Z$-type ferrite can have a low magnetic loss tangent of less than or equal to 0.03, while retaining a permeability of less than or equal to 2, a dielectric constant of less than or equal to 6, and a dielectric loss tangent of less than or equal to 0.008 at 1.0 to 1.6 GHz. The $Co_2Z$-type ferrite can have a low magnetic loss tangent of less than or equal to 0.13, while retaining a permeability of less than or equal to 2.7, a dielectric constant of less than or equal to 6.8, and a dielectric loss tangent of less than or equal to 0.005 at 1.0 to 1.6 GHz.

As used herein, the phrase "at a frequency of" can mean at a single frequency value in that range or over the entire frequency range. For example, the phrase "the permeability can be 2 to 10 at a frequency of 0.5 to 3 gigahertz," can mean that the permeability is a single value in the range of 2 to 10, for example, 3 at a single frequency in the range of 0.5 to 3, for example, at 1 gigahertz; or the permeability can be a value defined by the range of 2 to 10 (e.g. varying in this range with frequency) over the entire frequency range spanning from 0.5 to 3 gigahertz.

The magnetic and dielectric properties of the ferrites can be measured using a coaxial airline by vector network analyzer (VNA) in Nicholson-Ross-Weir (NRW) method over a frequency of 0.1 to 18 gigahertz.

The operating frequency of the $Co_2Z$-type ferrite can be as much as 6 gigahertz, or 0.5 to 2 gigahertz.

The $Co_2Z$-type ferrite can comprise oxides of at least Me, Co, Mo, Li, and Fe; wherein Me is at least one of Ba or Sr. The $Co_2Z$-type ferrite can have a formula $Li_2MoO_4 \cdot Ba_xSr_{3-x}Co_{2+y-z}Me'_yMe''_zFe_{24-2y-m}O_{41}$. The $Co_2Z$-type ferrite can have the formula of $Li_2MoO_4 \cdot Ba_xSr_{3-x}Co_2Fe_{24-m}O_{41}$. The $Co_2Z$-type ferrite can comprise a magnetic phase having the formula $Ba_xSr_{3-x}Co_{2+y-z}Me_yMe'_zFe_{24-2y-m}O_{41}$ and a dielectric phase having the formula $Li_2MoO_4$. The $Li_2MoO_4$ can be present in an amount of 0.1 to 1 weight percent based on a total weight of the $Co_2Z$-type ferrite. Me' can be at least one of Ti, Mo, Ru, Ir, Zr, or Sn. Me" can be at least one of Zn, Mn, or Mg. The variable x can be 0 to 3. The variable x can be 0.1 to 3, or 0.8 to 2, or 1 to 2, or 3. The variable y can be 0 to 1.8. The variable y can be 0, or 0.1 to 1.5, or 0.5 to 1. The variable z can be 0 to 1.8. The variable z can be 0, or 0.1 to 1.5, or 0.5 to 1. The variable m can be −4 to 4. The variable m can be −3 to 3, or 0 to 4, or 2 to 3. The $Co_2Z$-type ferrite can have a $D_{50}$ particle size of 2 to 10 micrometers. The $Co_2Z$-type ferrite can have a porosity of 0 to 50 volume percent, or 20 to 45 volume percent based on the total volume of the $Co_2Z$-type ferrite. The $Co_2Z$-type ferrite can have a permeability of greater than or equal to 2, or greater than or equal to 3, or 2 to 10, or 2 to 3 at a frequency of 0.5 to 2 gigahertz. The $Co_2Z$-type ferrite can have a magnetic loss tangent tan $\delta_\mu$, of less than or equal to 0.3, or less than or equal to 0.1, or 0.001 to 0.2 at a frequency of 0.5 to 2 gigahertz. The $Co_2Z$-type ferrite can have a permittivity of less than or equal to 8, or less than or equal to 7, or 5 to 7 at a frequency of 0.5 to 2 gigahertz. The $Co_2Z$-type ferrite can have a dielectric loss tangent tan $\delta_\varepsilon$ of less than or equal to 0.01, or less than or equal to 0.007, or 0.001 to 0.007 at a frequency of 0.5 to 2 gigahertz.

The $Co_2Z$-type ferrite can be prepared using any suitable method. Generally, the $Co_2Z$-type ferrite can be formed by milling an initial $Co_2Z$-type ferrite and lithium molybdate, $LiMoO_4$, to form a mixed ferrite and calcining the mixed ferrite to form the $Co_2Z$-type ferrite. The milling can occur for greater than or equal to 1.5 hours. The milling can occur at a mixing speed of greater than or equal to 300 revolutions per minute (rpm), or 300 to 1,000 rpm. The calcining the mixed ferrite can occur at a calcining temperature of 800 to 1,300° C., or 900 to 1,200° C. The calcining the mixed ferrite can occur for a calcining time of 0.5 to 20 hours, or 1 to 10 hours.

The initial $Co_2Z$-type ferrite can be formed by forming a mixture comprising the precursor compounds including various oxides, for example, of at least Me, Co, Me', Me", and Fe, wherein Me is at least one of Ba and Sr, to form a magnetic oxide mixture, and calcining the magnetic oxide mixture in an oxygen or air atmosphere to form the $Co_2Z$-type ferrite. The resultant initial $Co_2Z$-type ferrite can have the formula $Ba_xSr_{3-x}Co_{2+y-z}Me'_yMe''_zFe_{24-2y-m}O_{41}$, wherein Me' can comprise at least one of Ti, Mo, Ru, Ir, Zr, or Sn; Me" can comprise at least one of Zn, Mn, or Mg; x can be 0 to 3; y can be 0 to 1.8; z can be 0 to 1.8; and m can be −4 to 4. The milling can occur for greater than or equal to 1.5 hours. The milling can occur at a mixing speed of greater than or equal to 300 rpm, or 300 to 1,000 rpm. The calcining the mixed ferrite can occur at a calcining temperature of 800 to 1,300° C., or 900 to 1,250° C. The calcining the mixed ferrite can occur for a calcining time of 0.5 to 20 hours, or 1 to 10 hours. The calcined ferrite can have a $D_{50}$ particle size by volume of 1 to 10 micrometers.

The lithium molybdate can be prepared by milling $Li_2CO_3$ and $MoO_2$ to form a dielectric oxide mixture; and calcining the dielectric oxide mixture in an oxygen or air atmosphere to form the $Li_2MoO_4$. The calcining can occur at a temperature of 400 to 600, or 500 to 600° C. The calcining can occur for 1 to 6 hours. calcining can occur in air or oxygen. The calcined $Li_2MoO_4$ can be milled or otherwise to reduce the particle size of the resultant $Li_2MoO_4$, for example, to have a $D_{50}$ particle size by volume of 0.5 to 5 micrometers, or less than or equal to 1 micrometer.

The ramping rate of the respective calcining steps is not particularly limited and can occur at a ramping and cooling rate of 1 to 5 degrees Celsius per minute (° C./min), or 2 to 4° C./min. The respective calcining steps can occur in air or in an oxygen environment, for example, under a flow of oxygen at a flow rate of 0.1 to 10 liters per minute.

After the respective calcining steps, the calcined ferrite can be ground and screened to form coarse particles. The coarse particles can be ground to a $D_{50}$ particle size by volume of 0.1 to 20 micrometers, or 1 to 20 micrometers, or 0.1 to 1 micrometer. The particles can be ground, for example, in a wet-planetary ball mill by mixing for 2 to 10 hours, or 4 to 8 hours at a milling speed of less than or equal to 600 rpm, or 400 to 500 rpm. The milled mixture, for example, of the mixed $Co_2Z$-type ferrite can optionally be screened, for example, using a 10 to 300#sieve. The milled mixture can be mixed with a polymer such as poly(vinyl alcohol) to form granules. The granules can have an average Do particle size by volume of 50 to 300 micrometers. The milled mixture can be shaped or formed, for example, by compressing at a pressure of 0.2 to 2 megatons per centimeter squared. The milled mixture, either particulate or formed, can be heated at a temperature of 50 to 500° C., 200 to 1280° C., or 100 to 250° C. The milled mixture, either particulate or formed, can be post-annealed at an annealing temperature of 900 to 1,275° C., or 1,200 to 1,250° C. The heating or annealing can occur for 1 to 20 hours, or 4 to 6 hours, or 5 to 12 hours. The annealing can occur in air or oxygen. The $Co_2Z$-type ferrite can be in the form of a solid-solution or a bi-phase wherein the resultant structure may be in part dictated by the ratio of the magnetic phase and the dielectric phase or the formation conditions, for example, the extent of the milling or the annealing conditions.

The $Co_2Z$-type ferrite particles can be used to make a composite, for example, comprising the $Co_2Z$-type ferrite and a polymer. The polymer can comprise a thermoplastic or a thermoset. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, polyvinyl fluoride (PVF), polyvinylidene fluoride (PVDF), fluorinated ethylene-propylene (FEP), polytetrafluoroethylene (PTFE), poly (ethylene-tetrafluoroethylene (PETFE), or perfluoroalkoxy (PFA)), polyacetals (for example, polyoxyethylene or polyoxymethylene), poly($C_{1-6}$ alkyl)acrylates, polyacrylamides (including unsubstituted and mono-N- or di-N—($C_{1-8}$ alkyl) acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones (PEEK) or polyether ketone ketones (PEKK)), polyarylene ketones, polyarylene sulfides (for example, polyphenylene sulfides (PPS)), polyarylene sulfones (for example, polyethersulfones (PES) or polyphenylene sulfones (PPS)), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyester-ethers), polyetherimides (for example, copolymers such as polyetherimide-siloxane copolymers), polyimides (for example, copolymers such as polyimide-siloxane copolymers), poly($C_{1-6}$ alkyl)methacrylates, polyalkylacrylamides (for example, unsubstituted and mono-N- or di-N—($C_{1-8}$ alkyl)acrylamides), polyolefins (for example, polyethylenes, such as high density polyethylene (HDPE), low density polyethylene (LDPE), or linear low density polyethylene (LLDPE), polypropylenes, or their halogenated derivatives (such as polytetrafluoroethylenes), or their copolymers, for example, ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene (ABS) or methyl methacrylate-butadiene-styrene (MBS)), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers), a paraffin wax, or the like. A combination comprising at least one of the foregoing thermoplastic polymers can be used.

Thermoset polymers are derived from thermosetting monomers or prepolymers (resins) that can irreversibly harden and become insoluble with polymerization or cure, which can be induced by heat or exposure to radiation (e.g., ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers or copolymers thereof, e.g., poly(butadiene-isoprene)), polyisocyanates, polyureas, polyurethanes, triallyl cyanurate polymers, triallyl isocyanurate polymers, certain silicones, and polymerizable prepolymers (e.g., prepolymers having ethylenic unsaturation, such as unsaturated polyesters, polyimides), or the like. The prepolymers can be polymerized, copolymerized, or crosslinked, e.g., with a reactive monomer such as styrene, alpha-methylstyrene, vinyltoluene, chlorostyrene, acrylic acid, (meth)acrylic acid, a ($C_{1-6}$ alkyl) acrylate, a ($C_{1-6}$ alkyl)methacrylate, acrylonitrile, vinyl acetate, allyl acetate, triallyl cyanurate, triallyl isocyanurate, or acrylamide.

The polymer can comprise at least one of a fluoropolymer (for example, polytetrafluoroethylene (PTFE)), a polyolefin (for example, polyethylene or polypropylene), a polyurethane, a silicone polymer, a liquid crystalline polymer, a polyketone (for example, poly(ether ether ketone), or a polysulfone. The polyethylene can comprise at least one of a high density polyethylene, a low density polyethylene, or a linear low density polyethylene.

The $Co_2Z$-type ferrite composite can comprise 5 to 95 volume percent, or 50 to 80 volume percent of the $Co_2Z$-type ferrite based on the total volume of the $Co_2Z$-type ferrite composite. The $Co_2Z$-type ferrite composite can comprise 5 to 95 volume percent, or 20 to 50 volume percent of the polymer based on the total volume of the $Co_2Z$-type ferrite composite. The $Co_2Z$-type ferrite composite can be formed by compression molding, injection molding, reaction injection molding, laminating, extruding, calendering, casting, rolling, or the like. The composite can be free of a void space other than a porosity of the $Co_2Z$-type ferrite if present.

An article can comprise the $Co_2Z$-type ferrite. The article can be an antenna or an inductor core. The article can be for use in the gigahertz range, for example, over the range of 0.5 to 6 gigahertz, 0.5 to 5 gigahertz, or 0.5 to 2 gigahertz range. The article can be used for a variety of devices operable within the ultrahigh frequency range, such as a high frequency or microwave antenna, filter, inductor, circulator, or phase shifter. The article can be an antenna, a filter, an inductor, a circulator, or an EMI (electromagnetic interference) suppressor. Such articles can be used in commercial and military applications, weather radar, scientific communications, wireless communications, autonomous vehicles, aircraft communications, space communications, satellite communications, or surveillance.

The following examples are provided to illustrate the present disclosure. The examples are merely illustrative and are not intended to limit devices made in accordance with the disclosure to the materials, conditions, or process parameters set forth therein.

EXAMPLES

The magnetic permeability and the magnetic loss of the ferrites were measured in coaxial airline by vector network analyzer (VNA) in Nicholson-Ross-Weir (NRW) method over a frequency of 0.1 to 18 gigahertz (GHz).

Examples 1-7: Effect of the Lithium Molybdate on the Magnetic Properties on the $Co_2Z$-Type Ferrite An initial $Co_2Z$ phase was prepared by mixing $BaCO_3$, $Co_3O_4$, $Fe_2O_3$, $MoO_2$, and $SrCO_3$, in amounts to form a Z-type hexaferrite compositions. The oxide mixtures were mixed in a wet-plenary ball mill for two hours at 350 revolutions per minute (rpm), dried in an oven at 100° C., and screened through 40#sieve to form coarse particles. The coarse particles were then calcined at a temperature of 1,240° C. for a soak time of 4 hours in air to form the initial $Co_2Z$ phase having the formula $Sr_{1.5}Ba_{1.5}Co_{2.12}Mo_{0.12}Fe_{22.16}O_{41}$. The initial $Co_2Z$ phase was then jaw crushed into a powder through a 200#screen.

An $Li_2MoO_4$(LMO) phase was prepared by mixing $Li_2CO_3$ and $MoO_2$. The mixture was calcined at 540° C. for 2 hours in air at ramping and cooling rates of 2 to 4° C./min. The calcined LMO phase was ground in a planetary ball mill at 400 rpm for 0.5 to 4 hours. The resultant LMO phase had a $D_{50}$ particle size of 0.5 to 5 micrometers.

The initial $Co_2Z$ phase and the LMO phase were mixed to form a mixture with varying amounts of the LMO phase as indicated in Table 1, where x is the amount of the LMO phase in wt % based on the total weight of the initial $Co_2Z$ phase and the LMO phase. The mixtures were mixed in a planetary ball mill at 400 rpm for 2.5 hours and dried at 200° C. The dried mixtures were mixed with a 10 wt % poly(vinyl alcohol) solution and sieved through a 40#screen to form granules. The granules were pressed into toroids having an outer diameter of 7 millimeters (mm), an inner diameter of 3 mm, and a height of 3 to 4 mm by pressing under a force of 1,800 pounds (8 kilonewtons (kN)). The toroids were baked at 200° C. for 4 to 6 hours to remove any residual liquids. A porous ceramic was formed having a porosity of 40 volume percent.

Figure 1:
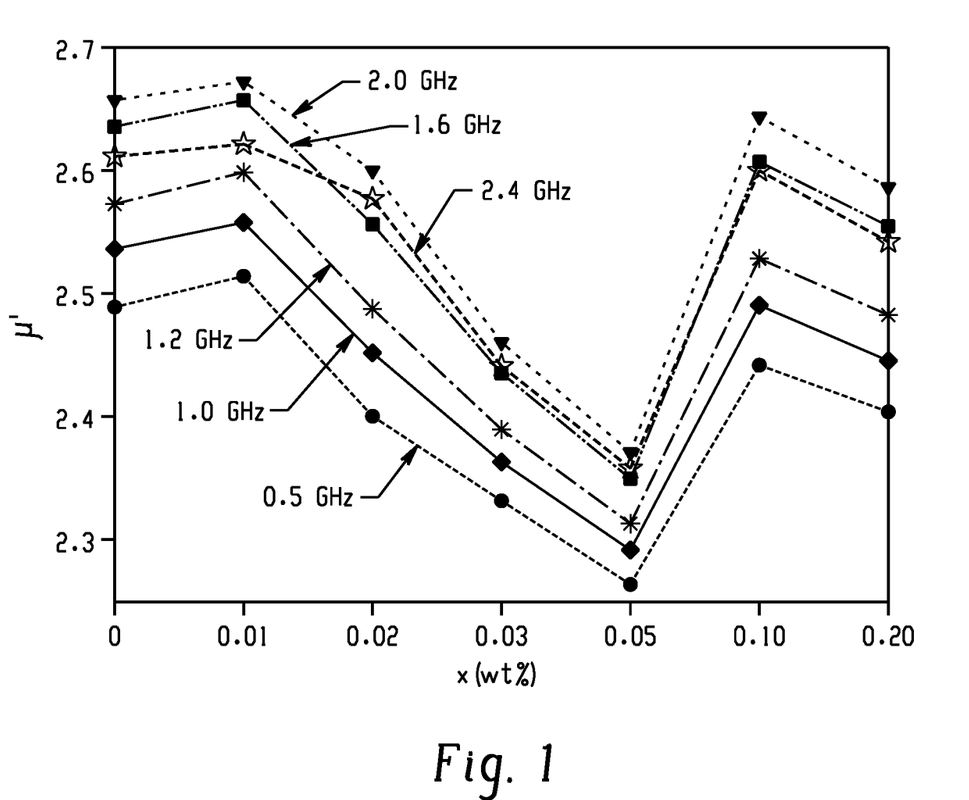
FIG. 1 is a graphical illustration of the permeability with lithium concentration at different frequencies for Examples 1-7.
Figure 2:
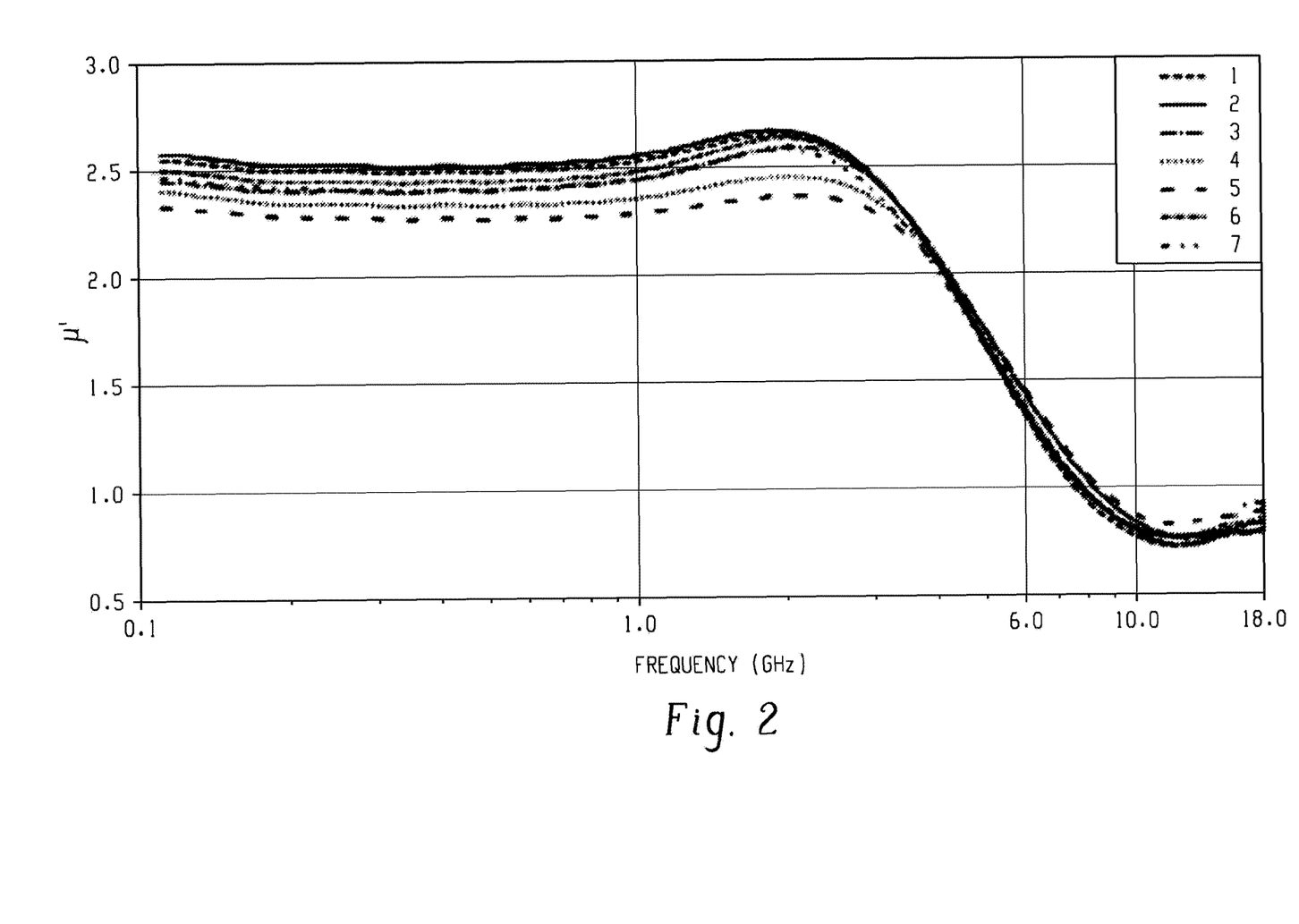
FIG. 2 is a graphical illustration of the permeability with frequency at different lithium concentrations for Examples 1-7.
Figure 3:
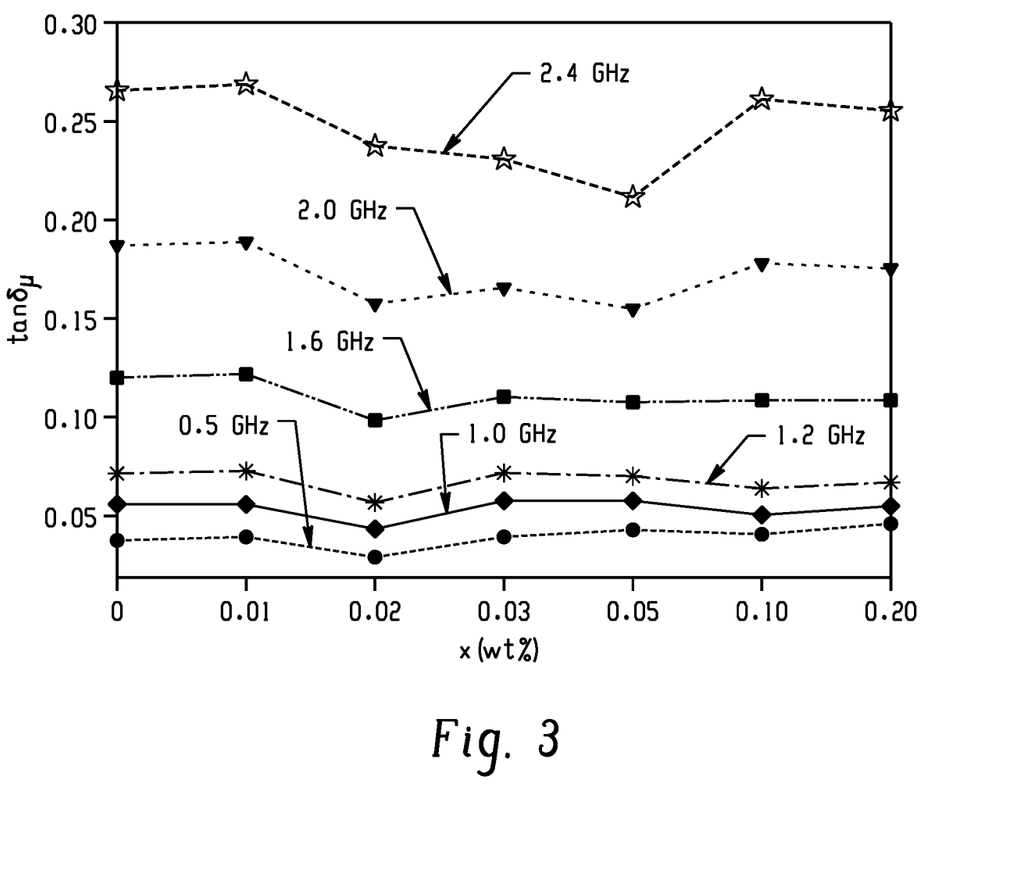
FIG. 3 is a graphical illustration of the magnetic loss with lithium concentration at different frequencies for Examples 1-7.
Figure 4:
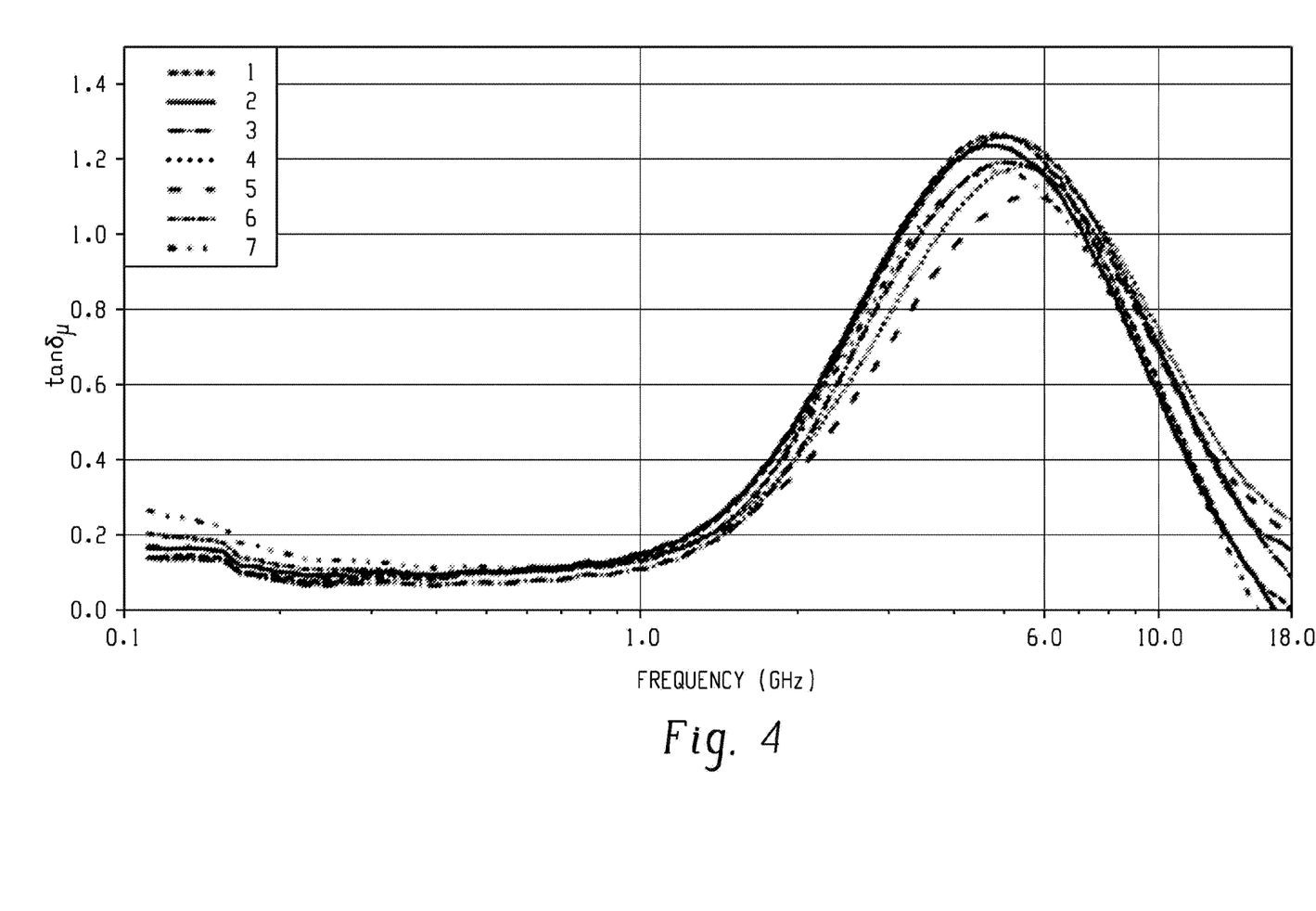
FIG. 4 is a graphical illustration of the magnetic loss with frequency at different lithium concentrations for Examples 1-7.

The magnetic properties of Examples 1-7 are shown in Table 1, FIG. 1 that illustrates the permeability with increasing LMO concentration at varying frequencies, FIG. 2 that illustrates the permeability with frequency at varying LMO concentrations, FIG. 3 that illustrates the magnetic loss with increasing LMO concentration at varying frequencies, and FIG. 4 illustrates the magnetic loss tangent, tan $\delta_\mu$, with frequency at varying LMO concentrations.

Figure 5:
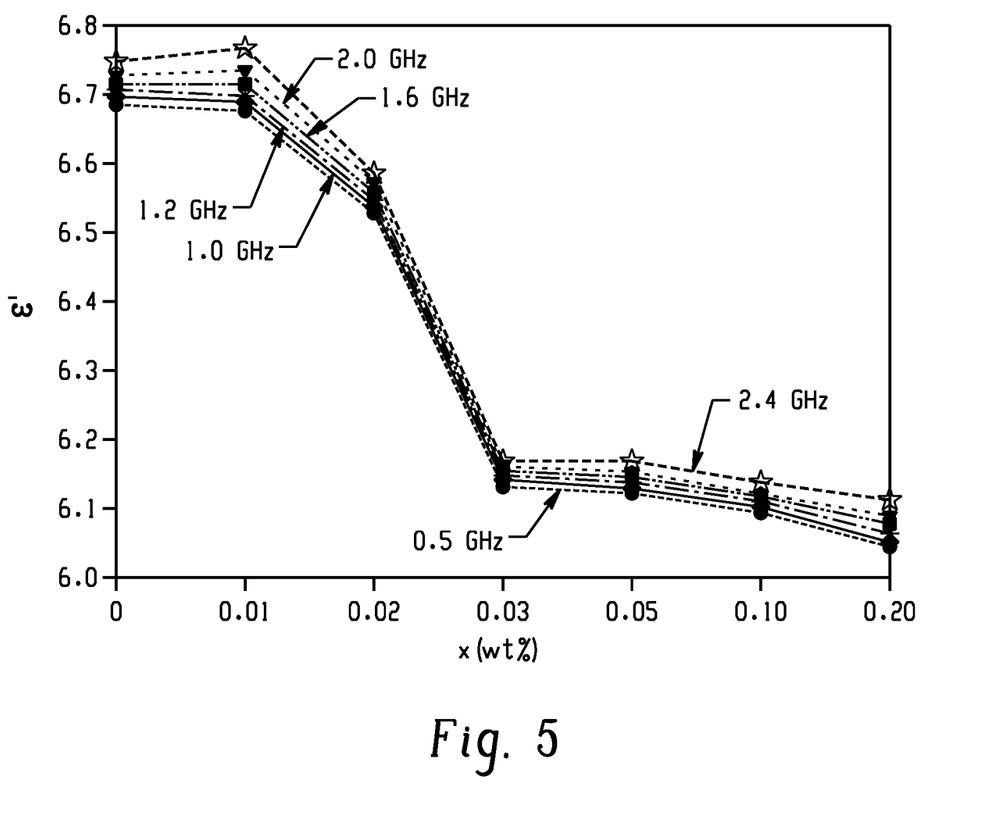
FIG. 5 is a graphical illustration of the permittivity with lithium concentration at different frequencies for Examples 1-7.
Figure 6:
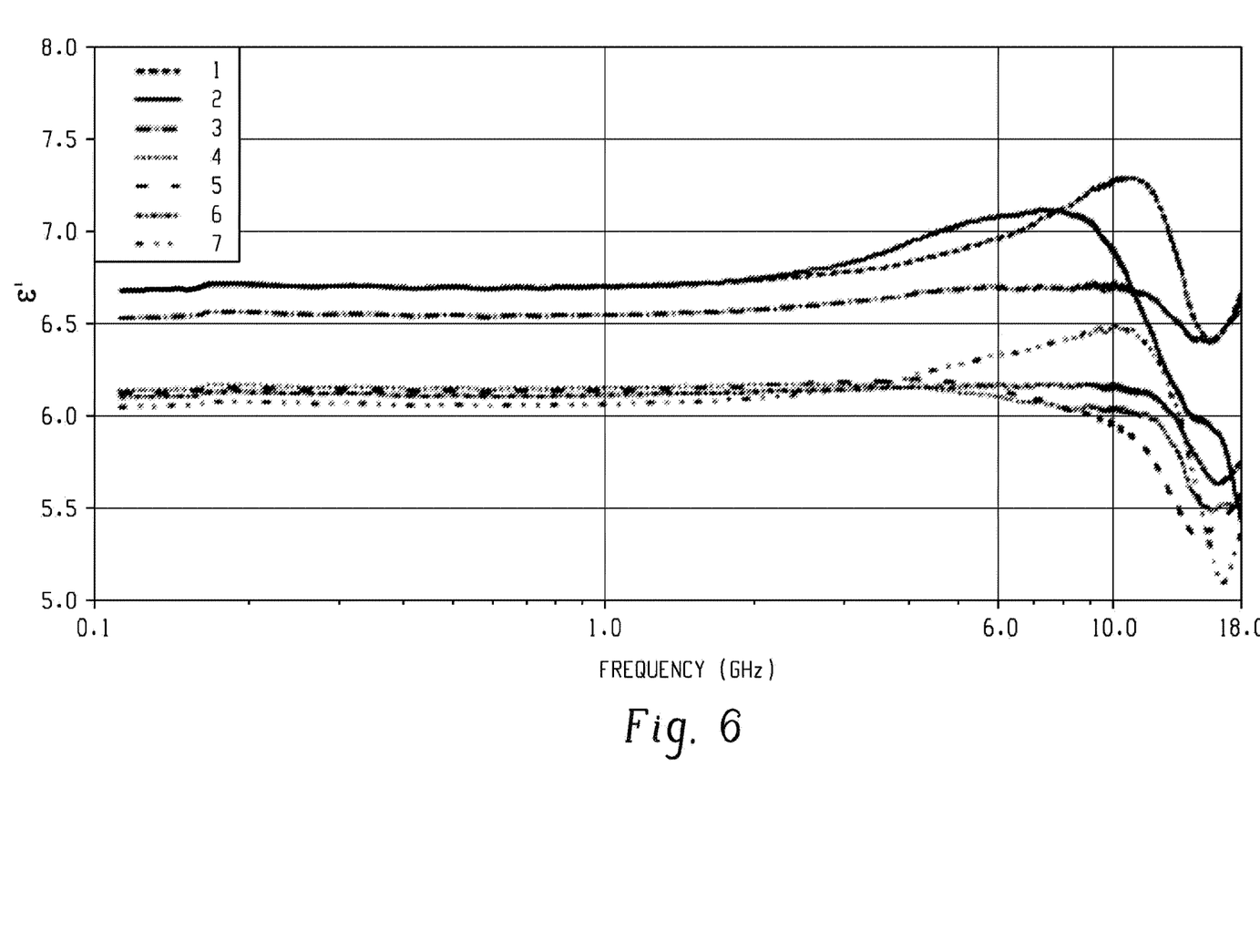
FIG. 6 is a graphical illustration of the permittivity with frequency at different lithium concentrations for Examples 1-7.
Figure 7:
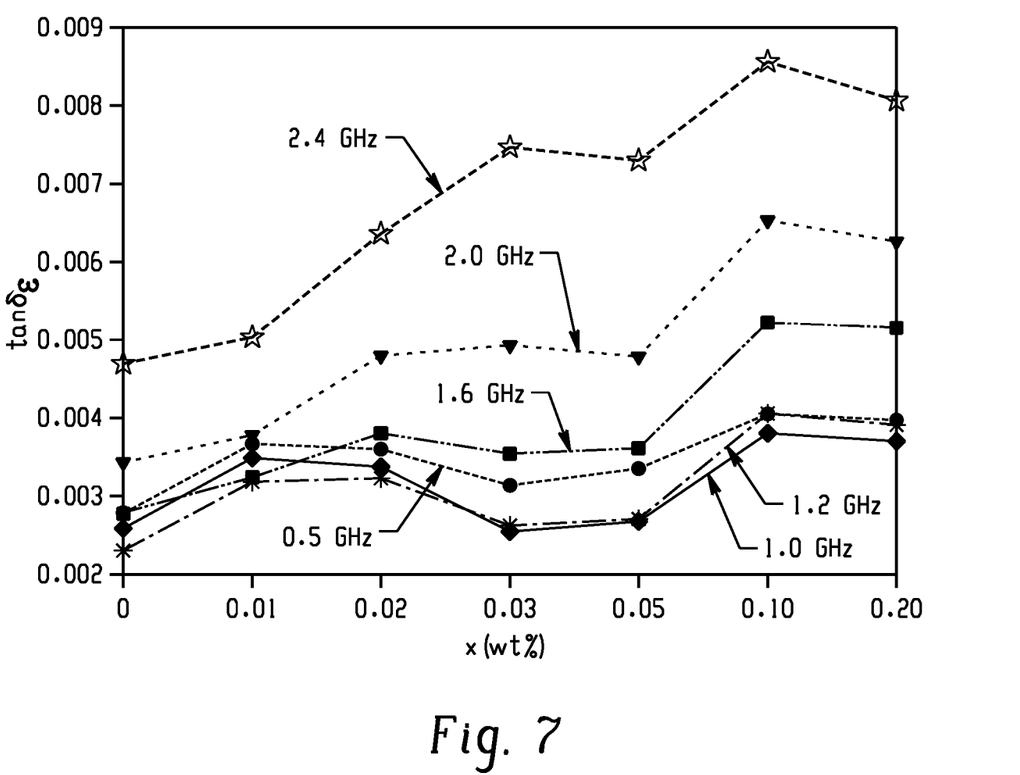
FIG. 7 is a graphical illustration of the dielectric loss with lithium concentration at different frequencies for Examples 1-7.
Figure 8:
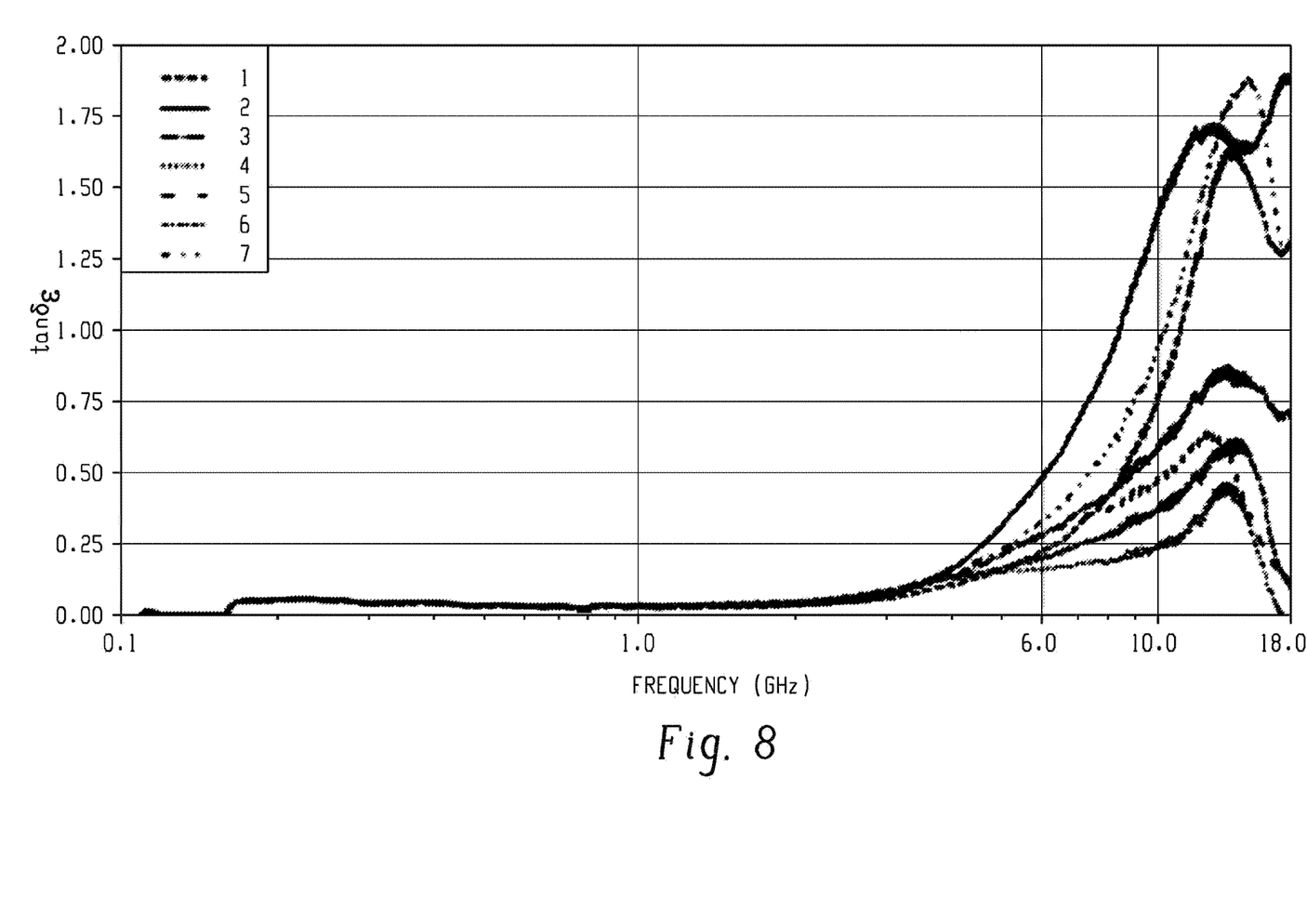
FIG. 8 is a graphical illustration of the dielectric loss with frequency at different lithium concentrations for Examples 1-7.
Figure 9:
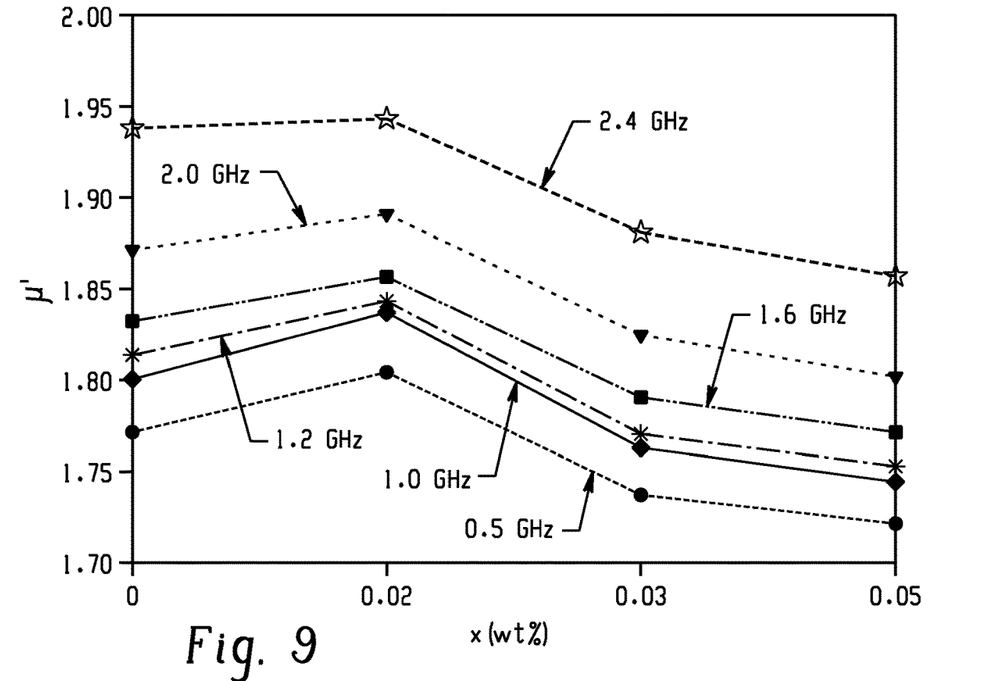
FIG. 9 is a graphical illustration of the permeability with lithium concentration at different frequencies for Examples 8-11.
Figure 10:
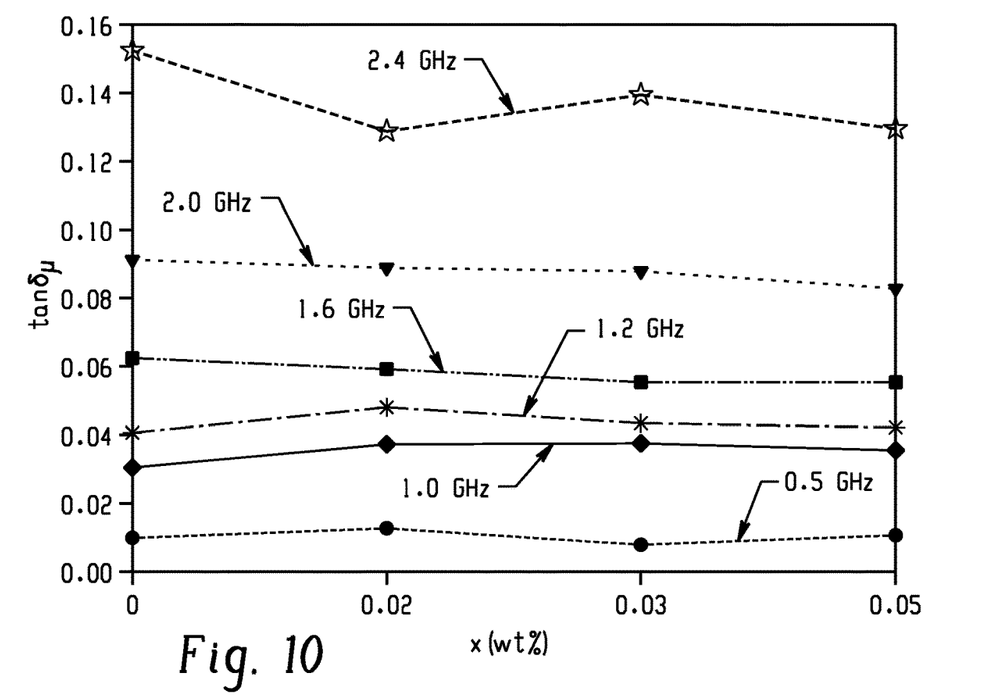
FIG. 10 is a graphical illustration of the magnetic loss with lithium concentration at different frequencies for Examples 8-11.
Figure 11:
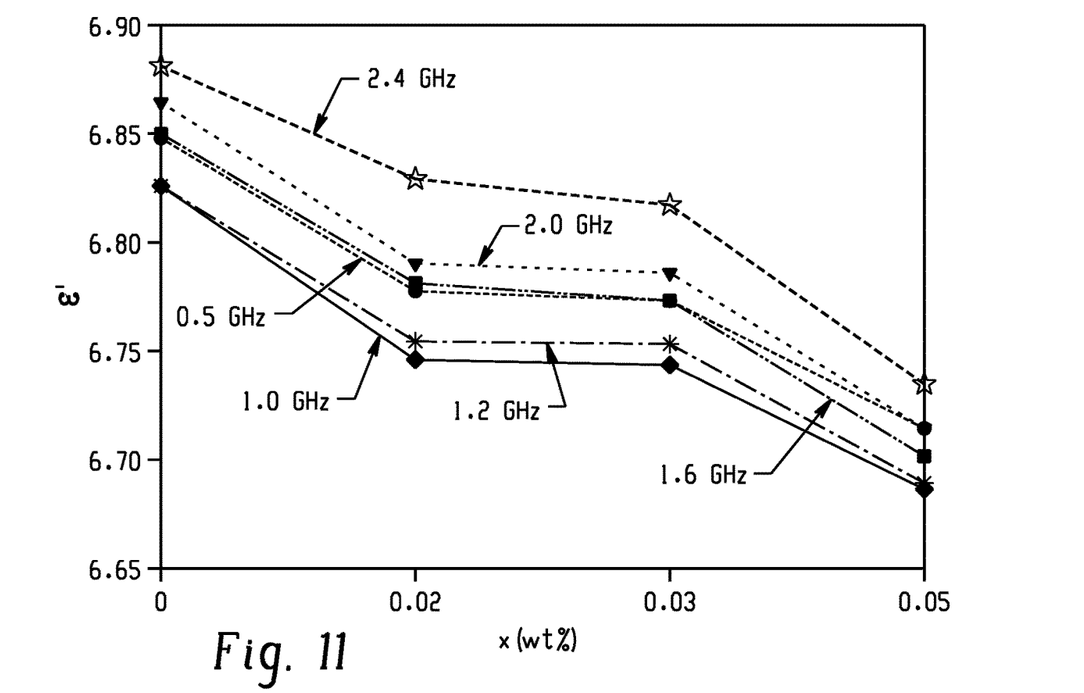
FIG. 11 is a graphical illustration of the permittivity with lithium concentration at different frequencies for Examples 8-11.
Figure 12:
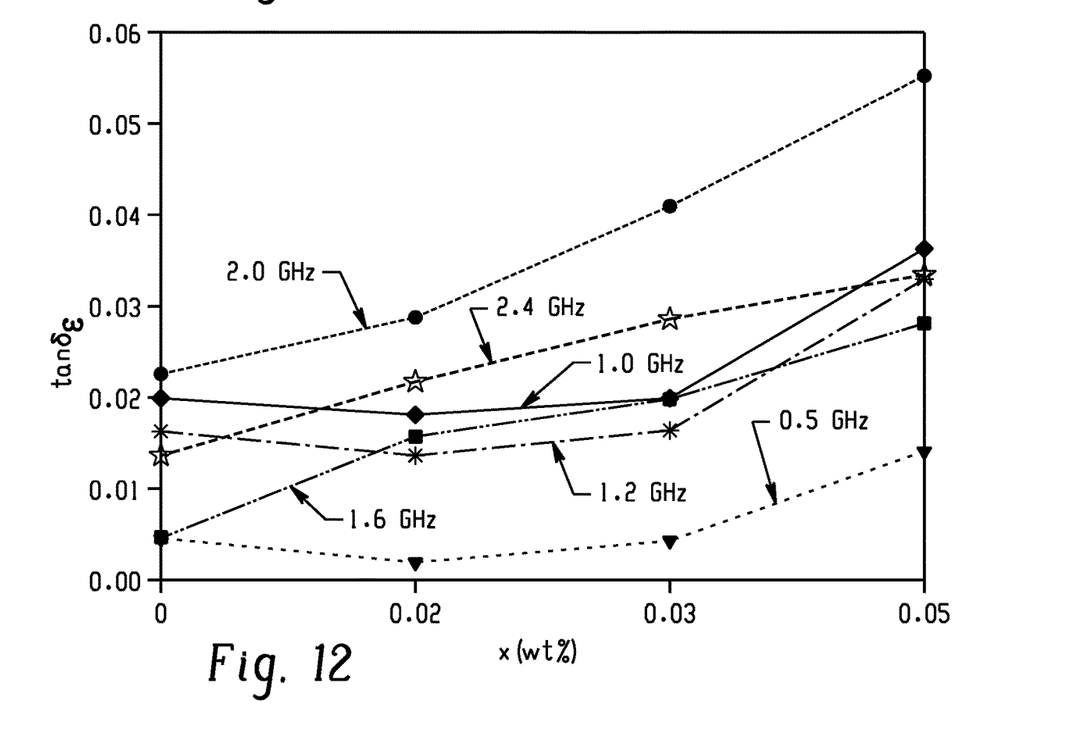
FIG. 12 is a graphical illustration of the dielectric loss with lithium concentration at different frequencies for Examples 8-11.

The dielectric properties of Examples 1-7 are shown in Table 2, FIG. 5 that illustrates the permittivity with increasing LMO concentration at varying frequencies, FIG. 6 that illustrates the permittivity with frequency at varying LMO concentrations, FIG. 7 that illustrates the dielectric loss with increasing LMO concentration at varying frequencies, and FIG. 8 that illustrates the dielectric loss tangent, tan $\delta_\epsilon$, with frequency at varying LMO concentrations.

TABLE 1

| Example (x, wt %) | 0.5 GHz | | 1.0 GHz | | 1.2 GHz | | 1.6 GHz | | 2.0 GHz | | 2.4 GHz | |
|---|---|---|---|---|---|---|---|---|---|---|---|---|
| | $\mu'$ | $\mu''/\mu'$ | $\mu'$ | $\mu''/\mu'$ | $\mu'$ | $\mu''/\mu'$ | $\mu'$ | $\mu''/\mu'$ | $\mu'$ | $\mu''/\mu'$ | $\mu'$ | $\mu''/\mu'$ |
| 1 (0) | 2.489 | 0.039 | 2.537 | 0.057 | 2.573 | 0.072 | 2.635 | 0.120 | 2.655 | 0.186 | 2.610 | 0.266 |
| 2 (0.01) | 2.512 | 0.040 | 2.560 | 0.058 | 2.598 | 0.074 | 2.657 | 0.123 | 2.671 | 0.189 | 2.620 | 0.269 |
| 3 (0.02) | 2.401 | 0.031 | 2.453 | 0.044 | 2.489 | 0.057 | 2.556 | 0.098 | 2.600 | 0.158 | 2.576 | 0.238 |
| 4 (0.03) | 2.332 | 0.041 | 2.362 | 0.058 | 2.389 | 0.071 | 2.436 | 0.111 | 2.460 | 0.165 | 2.441 | 0.231 |
| 5 (0.05) | 2.265 | 0.044 | 2.290 | 0.059 | 2.312 | 0.071 | 2.350 | 0.107 | 2.369 | 0.155 | 2.360 | 0.213 |
| 6 (0.10) | 2.441 | 0.041 | 2.491 | 0.052 | 2.530 | 0.065 | 2.607 | 0.109 | 2.644 | 0.178 | 2.601 | 0.261 |
| 7 (0.20) | 2.403 | 0.047 | 2.447 | 0.056 | 2.483 | 0.067 | 2.555 | 0.110 | 2.585 | 0.176 | 2.541 | 0.256 |

TABLE 2

| Example (x, wt %) | 0.5 GHz | | 1.0 GHz | | 1.2 GHz | | 1.6 GHz | | 2.0 GHz | | 2.4 GHz | |
|---|---|---|---|---|---|---|---|---|---|---|---|---|
| | $\varepsilon'$ | $\varepsilon''/\varepsilon'$ | $\varepsilon'$ | $\varepsilon''/\varepsilon'$ | $\varepsilon'$ | $\varepsilon''/\varepsilon'$ | $\varepsilon'$ | $\varepsilon''/\varepsilon'$ | $\varepsilon'$ | $\varepsilon''/\varepsilon'$ | $\varepsilon'$ | $\varepsilon''/\varepsilon'$ |
| 1 (0) | 6.697 | 0.003 | 6.699 | 0.003 | 6.701 | 0.002 | 6.717 | 0.003 | 6.727 | 0.003 | 6.748 | 0.005 |
| 2 (0.01) | 6.693 | 0.004 | 6.695 | 0.004 | 6.698 | 0.003 | 6.717 | 0.003 | 6.736 | 0.004 | 6.770 | 0.005 |
| 3 (0.02) | 6.542 | 0.004 | 6.544 | 0.003 | 6.545 | 0.003 | 6.559 | 0.004 | 6.568 | 0.005 | 6.586 | 0.006 |
| 4 (0.03) | 6.144 | 0.003 | 6.143 | 0.003 | 6.144 | 0.003 | 6.155 | 0.004 | 6.159 | 0.005 | 6.169 | 0.007 |
| 5 (0.05) | 6.129 | 0.003 | 6.130 | 0.003 | 6.132 | 0.003 | 6.145 | 0.004 | 6.154 | 0.005 | 6.170 | 0.007 |
| 6 (0.10) | 6.107 | 0.004 | 6.107 | 0.004 | 6.108 | 0.004 | 6.119 | 0.005 | 6.122 | 0.007 | 6.133 | 0.009 |
| 7 (0.20) | 6.056 | 0.004 | 6.059 | 0.004 | 6.063 | 0.004 | 6.077 | 0.005 | 6.089 | 0.006 | 6.110 | 0.008 |

The data shows that the presence of the LMO phase in Examples 2-7 results in easily tunable dielectric properties that can be obtained while maintaining the magnetic properties.

Examples 8-11: Polymer Composites Comprising the LMO-Co$_2$Z-Type Ferrite

Four polymer composites were prepared using the Co$_2$Z-type ferrites of Examples 1, 3, 4, and 5, respectively. The composites were formed by milling the Co$_2$Z phase and the LMO phase in accordance with the above examples in a planetary ball mill at 400 rpm for 2.5 hours, followed by drying at 200° C. The resulting powder was annealed at 920° C. for 2 hours in oxygen at a flow rate of 0.7 liters per minute (L/m) in a tube furnace. The annealed ferrite had a D$_{50}$ particle size of 3 to 4 micrometers. The annealed ferrites were mixed with a paraffin wax to form composites comprising 53 vol % of the LiZ ferrite and 47 vol % of paraffin wax.

TABLE 3

| Example (x, wt %) | 0.5 GHz | | 1.0 GHz | | 1.2 GHz | | 1.6 GHz | | 2.0 GHz | | 2.4 GHz | |
|---|---|---|---|---|---|---|---|---|---|---|---|---|
| | $\mu'$ | $\mu''/\mu'$ | $\mu'$ | $\mu''/\mu'$ | $\mu'$ | $\mu''/\mu'$ | $\mu'$ | $\mu''/\mu'$ | $\mu'$ | $\mu''/\mu'$ | $\mu'$ | $\mu''/\mu'$ |
| 8 (0) | 1.772 | 0.005 | 1.800 | 0.017 | 1.814 | 0.022 | 1.832 | 0.034 | 1.871 | 0.048 | 1.938 | 0.079 |
| 9 (0.02) | 1.804 | 0.007 | 1.837 | 0.021 | 1.843 | 0.026 | 1.856 | 0.032 | 1.892 | 0.047 | 1.944 | 0.066 |
| 10 (0.03) | 1.736 | 0.005 | 1.763 | 0.021 | 1.770 | 0.025 | 1.791 | 0.031 | 1.825 | 0.048 | 1.881 | 0.074 |
| 11 (0.05) | 1.722 | 0.006 | 1.745 | 0.020 | 1.753 | 0.024 | 1.771 | 0.031 | 1.801 | 0.046 | 1.858 | 0.070 |

TABLE 4

| Example (x, wt %) | 0.5 GHz | | 1.0 GHz | | 1.2 GHz | | 1.6 GHz | | 2.0 GHz | | 2.4 GHz | |
|---|---|---|---|---|---|---|---|---|---|---|---|---|
| | $\varepsilon'$ | $\varepsilon''/\varepsilon'$ | $\varepsilon'$ | $\varepsilon''/\varepsilon'$ | $\varepsilon'$ | $\varepsilon''/\varepsilon'$ | $\varepsilon'$ | $\varepsilon''/\varepsilon'$ | $\varepsilon'$ | $\varepsilon''/\varepsilon'$ | $\varepsilon'$ | $\varepsilon''/\varepsilon'$ |
| 8 (0) | 6.848 | 0.0033 | 6.825 | 0.0029 | 6.826 | 0.0024 | 6.851 | 0.0006 | 6.863 | 0.0006 | 6.881 | 0.0020 |
| 9 (0.02) | 6.777 | 0.0043 | 6.745 | 0.0027 | 6.755 | 0.0021 | 6.780 | 0.0023 | 6.790 | 0.0003 | 6.828 | 0.0031 |
| 10 (0.03) | 6.772 | 0.0061 | 6.743 | 0.0030 | 6.752 | 0.0025 | 6.772 | 0.0029 | 6.785 | 0.0006 | 6.816 | 0.0042 |
| 11 (0.05) | 6.716 | 0.0083 | 6.686 | 0.0054 | 6.688 | 0.0049 | 6.703 | 0.0042 | 6.714 | 0.0021 | 6.735 | 0.0050 |

The data shows that the presence of LMO in Examples 9-11 results in composites with easily tunable dielectric properties that can be obtained while maintaining the magnetic properties.

Example 12: Elemental Analysis the LMO-Co$_2$Z-Type Ferrite

X-ray photoelectron spectroscopy analysis for three powder samples was performed and the results are shown in Table 5. Table 5 shows that the ratio of the various forms of iron, cobalt, and molybdenum change as the amount of the LMO phase is increased indicating that there is a separate LMO phase present in the Co$_2$Z-type ferrite.

TABLE 5

| Sample | Fe$^{2+}$:Fe$^{3+}$ Ratio | Co$^{2+}$:Co$^{3+}$ Ratio | Mo$^{4+}$:Mo$^{6+}$ Ratio |
|---|---|---|---|
| 1 (0) | 1:1.1 | 1:1.1 | 1:0.16 |
| 3 (0.03) | 1:0.50 | 1:6.1 | 1:0.20 |
| 7 (0.20) | 1:0.54 | 1:1.3 | 1:1.60 |

Set forth below are non-limiting aspects of the present disclosure.

Aspect 1: A Co$_2$Z-type ferrite, comprising: oxides of at least Me, Co, Mo, Li, and Fe; wherein Me is at least one of Ba or Sr.

Aspect 2: The Co$_2$Z-type ferrite of Aspect 1, wherein the Co$_2$Z-type ferrite has a formula Li$_2$MoO$_4$·Ba$_x$Sr$_{3-x}$Co$_{2+y-z}$Me'$_y$Me''$_z$Fe$_{24-2y-m}$O$_{41}$, wherein Me' is at least one of Ti, Mo, Ru, Ir, Zr, or Sn; Me'' is at least one of Zn, Mn, or Mg; x is 0 to 3; y is 0 to 1.8; z is 0 to 1.8; and m is −4 to 4.

Aspect 3: The Co$_2$Z-type ferrite of Aspect 2, wherein at least one of x is 0.1 to 3, or 0.8 to 2, or 1 to 2, or 3; y is 0, or 0.1 to 1.5, or 0.5 to 1; z is 0, or 0.1 to 1.5, or 0.5 to 1; or m is −3 to 3, or 0 to 4, or 2 to 3.

Aspect 4: The Co$_2$Z-type ferrite of Aspect 2 or Aspect 3, wherein the Co$_2$Z-type ferrite has the formula of Li$_2$MoO$_4$·Ba$_x$Sr$_{3-x}$Co$_2$Fe$_{24-m}$O$_{41}$; wherein x is 0 to 3, or 0.1 to 3, or 0.8 to 2, or 1 to 2, or 3; wherein m is −4 to 4, or 0 to 4, or 2 to 3.

Aspect 5: The Co$_2$Z-type ferrite of any of Aspects 2 to 4, wherein the Li$_2$MoO$_4$ is present in an amount of 0.1 to 1 weight percent based on a total weight of the Co$_2$Z-type ferrite.

Aspect 6: The Co$_2$Z-type ferrite of any of the preceding aspects, wherein the Co$_2$Z-type ferrite comprises a magnetic phase having the formula Ba$_x$Sr$_{3-x}$Co$_{2+y-z}$Me$_y$Me'$_z$Fe$_{24-2y-m}$O$_{41}$, wherein Me' is at least one of Ti, Mo, Ru, Ir, Zr, or Sn; Me' is at least one of Zn, Mn, or Mg; x is 0 to 3; y is 0 to 1.8; z is 0 to 1.8; and m is −4 to 4; and a dielectric phase having the formula Li$_2$MoO$_4$.

Aspect 7: The Co$_2$Z-type ferrite of any of the preceding aspects, wherein the Co$_2$Z-type ferrite has at least one of a D$_{50}$ particle size of 2 to 10 micrometers or a porosity of 0 to 50 volume percent, or 20 to 45 volume percent based on the total volume of the Co$_2$Z-type ferrite.

Aspect 8: The Co$_2$Z-type ferrite of any of the preceding aspects, wherein the Co$_2$Z-type ferrite has a permeability of greater than or equal to 2, or greater than or equal to 3, or 2 to 10, or 2 to 3 at a frequency of 0.5 to 2 gigahertz.

Aspect 9: The Co$_2$Z-type ferrite of any of the preceding aspects, wherein the Co$_2$Z-type ferrite has a magnetic loss tangent tan $\delta_\mu$, of less than or equal to 0.3, or less than or equal to 0.1, or 0.001 to 0.2 at a frequency of 0.5 to 2 gigahertz.

Aspect 10: The Co$_2$Z-type ferrite of any of the preceding aspects, wherein the Co$_2$Z-type ferrite has a permittivity of less than or equal to 8, or less than or equal to 7, or 5 to 7 at a frequency of 0.5 to 2 gigahertz.

Aspect 11: The Co$_2$Z-type ferrite of any of the preceding aspects, wherein the Co$_2$Z-type ferrite has a dielectric loss tangent tan $\delta_\varepsilon$ of less than or equal to 0.01, or less than or equal to 0.007, or 0.001 to 0.007 at a frequency of 0.5 to 2 gigahertz.

Aspect 12: A composite comprising a polymer and the Co$_2$Z-type ferrite of any of the preceding aspects.

Aspect 13: The composite of Aspect 12, wherein the polymer comprises at least one of a fluoropolymer, a polyurethane, a silicone polymer, a liquid crystalline polymer, a polyketone, a polysulfone, or a polyolefin.

Aspect 14: An article comprising the ferrite composition of any of Aspects 1 to 12 or the composite of any one of Aspects 12 to 13.

Aspect 15: The article of Aspect 14, wherein the article is an antenna, a filter, an inductor, a circulator, or an EMI suppressor.

Aspect 16: A method of making a Co$_2$Z-type ferrite (optionally of any of Aspects 1 to 11) comprising: milling an initial Z-type ferrite and LiMoO$_4$ to form a mixed ferrite; and calcining the mixed ferrite to form the Co$_2$Z-type ferrite.

Aspect 17: The method of Aspect 16, wherein the milling occurs for greater than or equal to 1.5 hours; or at a mixing speed of greater than or equal to 300 revolutions per minute.

Aspect 18: The method of Aspect 16 or Aspect 17, further comprising: milling ferrite precursor compounds comprising oxides of Me, Co, Me', Me'', and Fe, to form a magnetic oxide mixture; wherein Me comprises at least one of Ba or Sr; Me' is at least one of Ti, Mo, Ru, Ir, Zr, or Sn; and Me'' is at least one of Zn, Mn, or Mg; calcining the magnetic oxide mixture in an oxygen or air atmosphere to form the initial Co$_2$Z-type ferrite having the formula Ba$_x$Sr$_{3-x}$Co$_{2+y-z}$Me'$_y$Me''$_z$Fe$_{24-2y-m}$O$_{41}$, wherein Me' is at least one of Ti, Mo, Ru, Ir, Zr, or Sn; Me'' is at least one of Zn, Mn, or Mg; x is 0 to 3; y is 0 to 1.8; z is 0 to 1.8; and m is −4 to 4.

Aspect 19: The method of any of Aspects 16 to 18, further comprising milling LiCO$_2$ and MoO$_2$ to form a dielectric oxide mixture; and calcining the dielectric oxide mixture in an oxygen or air atmosphere to form the Li$_2$MoO$_4$.

Aspect 20: The method of any of Aspects 16 to 19, wherein the calcining the mixed ferrite occurs at a calcining temperature of 800 to 1,300° C., or 900 to 1,200° C. or for a calcining time of 0.5 to 20 hours, or 1 to 10 hours.

Aspect 21: The method of any of Aspects 16 to 20, further comprising forming a composite comprising the Co$_2$Z-type ferrite and a polymer.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A $Co_2Z$-type ferrite, comprising:
   oxides of at least Me, Co, Mo, Li, and Fe;
   wherein Me is at least one of Ba or Sr.

2. The $Co_2Z$-type ferrite of claim 1, wherein the $Co_2Z$-type ferrite has a formula $Li_2MoO_4 \cdot Ba_xSr_{3-x}CO_{2+y-z}Me'_yMe''_zFe_{24-2y-m}O_{41}$, wherein Me' is at least one of Ti, Mo, Ru, Ir, Zr, or Sn; Me'' is at least one of Zn, Mn, or Mg; x is 0 to 3; y is 0 to 1.8; z is 0 to 1.8; and m is −4 to 4.

3. The $Co_2Z$-type ferrite of claim 2, wherein at least one of
   x is 0.1 to 3;
   y is 0 to 1.5;
   z is 0 to 1.5; or
   m is −3 to 4.

4. The $Co_2Z$-type ferrite of claim 2, wherein the $Co_2Z$-type ferrite has the formula of $Li_2MoO_4 \cdot Ba_xSr_{3-x}Co_2Fe_{24-m}O_{41}$; wherein x is 0 to 3; wherein m is −4 to 4.

5. The $Co_2Z$-type ferrite of claim 2, wherein the $Li_2MoO_4$ is present in an amount of 0.1 to 1 weight percent based on a total weight of the $Co_2Z$-type ferrite.

6. The $Co_2Z$-type ferrite of claim 1, wherein the $Co_2Z$-type ferrite comprises
   a magnetic phase having the formula $Ba_xSr_{3-x}CO_{2+y-z}Me'_yMe''_zFe_{24-2y-m}O_{41}$, wherein Me' is at least one of Ti, Mo, Ru, Ir, Zr, or Sn; Me' is at least one of Zn, Mn, or Mg; x is 0 to 3; y is 0 to 1.8; z is 0 to 1.8; and m is −4 to 4; and
   a dielectric phase having the formula $Li_2MoO_4$.

7. The $Co_2Z$-type ferrite of claim 1, wherein the $Co_2Z$-type ferrite has a $D_{50}$ particle size of 2 to 10 micrometers; or wherein the $Co_2Z$-type ferrite has a porosity of 0 to 50 volume percent based on the total volume of the $Co_2Z$-type ferrite.

8. The $Co_2Z$-type ferrite of claim 1, wherein the $Co_2Z$-type ferrite has a permeability of greater than or equal to 2 at a frequency of 0.5 to 2 gigahertz; or wherein the $Co_2Z$-type ferrite has a magnetic loss tangent $\tan \delta_\mu$ of less than or equal to 0.3 at a frequency of 0.5 to 2 gigahertz.

9. The $Co_2Z$-type ferrite of claim 1, wherein the $Co_2Z$-type ferrite has a permittivity of less than or equal to 8 at a frequency of 0.5 to 2 gigahertz.

10. The $Co_2Z$-type ferrite of claim 1, wherein the $Co_2Z$-type ferrite has a dielectric loss tangent $\tan \delta_\epsilon$ of less than or equal to 0.01 at a frequency of 0.5 to 2 gigahertz.

11. A composite comprising a polymer and the $Co_2Z$-type ferrite of claim 1.

12. The composite of claim 11, wherein the polymer comprises at least one of a fluoropolymer, a polyurethane, a silicone polymer, a liquid crystalline polymer, a polyketone, a polysulfone, or a polyolefin.

13. An article comprising the ferrite composition of claim 1.

14. The article of claim 13, wherein the article is an antenna, a filter, an inductor, a circulator, or an EMI suppressor.

15. A method of making the $Co_2Z$-type ferrite of claim 1 comprising:
   milling an initial $Co_2Z$-type ferrite and $LiMoO_4$ to form a mixed ferrite; and
   calcining the mixed ferrite to form the $Co_2Z$-type ferrite.

16. The method of claim 15, wherein the milling occurs for greater than or equal to 1.5 hours; or at a mixing speed of greater than or equal to 300 revolutions per minute.

17. The method of claim 15, further comprising:
   milling ferrite precursor compounds comprising oxides of Me, Co, Me', Me'', and Fe, to form a magnetic oxide mixture; wherein Me comprises at least one of Ba or Sr; Me' is at least one of Ti, Mo, Ru, Ir, Zr, or Sn; and Me'' is at least one of Zn, Mn, or Mg;
   calcining the magnetic oxide mixture in an oxygen or air atmosphere to form the initial $Co_2Z$-type ferrite having the formula $Ba_xSr_{3-x}CO_{2+y-z}Me'_yMe''_zFe_{24-2y-m}O_{41}$, wherein Me' is at least one of Ti, Mo, Ru, Ir, Zr, or Sn; Me'' is at least one of Zn, Mn, or Mg; x is 0 to 3; y is 0 to 1.8; z is 0 to 1.8; and m is −4 to 4.

18. The method of claim 15, further comprising milling $Li_2CO_3$ and $MoO_2$ to form a dielectric oxide mixture; and calcining the dielectric oxide mixture in an oxygen or air atmosphere to form the $Li_2MoO_4$.

19. The method of claim 15, wherein the calcining the mixed ferrite occurs at a calcining temperature of 800 to 1,300° C. or for a calcining time of 0.5 to 20 hours.

20. The method of claim 15, further comprising forming a composite comprising the $Co_2Z$-type ferrite and a polymer.

* * * * *